United States Patent
Li et al.

(10) Patent No.: US 9,172,566 B1
(45) Date of Patent: Oct. 27, 2015

(54) METHODS AND APPARATUS FOR MULTIPLE-STAGE CTLE ADAPTATION

(71) Applicant: ALTERA CORPORATION, San Jose, CA (US)

(72) Inventors: Wei Li, Fremont, CA (US); Weiqi Ding, Fremont, CA (US); Wilson Wong, San Francisco, CA (US); Jie Shen, Fremont, CA (US); Xudong Shi, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 127 days.

(21) Appl. No.: 14/057,945

(22) Filed: Oct. 18, 2013

(51) Int. Cl.
*H03H 7/30* (2006.01)
*H04L 25/03* (2006.01)

(52) U.S. Cl.
CPC ................. *H04L 25/03885* (2013.01)

(58) Field of Classification Search
CPC .................. H04L 25/03038; H04L 25/03057; H04L 25/03019
USPC .......................... 375/232, 233, 230
See application file for complete search history.

(56) References Cited

U.S. PATENT DOCUMENTS

| | | | |
|---|---|---|---|
| 2003/0063664 A1* | 4/2003 | Bodenschatz | ................ 375/232 |
| 2009/0316770 A1 | 12/2009 | Hidaka | |
| 2009/0316771 A1 | 12/2009 | Hidaka | |
| 2012/0170638 A1 | 7/2012 | Chen | |
| 2012/0201289 A1* | 8/2012 | Abdalla et al. | ................ 375/233 |
| 2012/0207202 A1 | 8/2012 | Hidaka | |
| 2013/0142244 A1 | 6/2013 | Tan | |
| 2013/0148712 A1 | 6/2013 | Malipatil et al. | |

* cited by examiner

*Primary Examiner* — Daniel Washburn
*Assistant Examiner* — Fitwi Hailegiorgis
(74) *Attorney, Agent, or Firm* — Okamoto & Benedicto LLP

(57) ABSTRACT

A method of equalizing an input data signal using a multiple-stage continuous-time linear equalization (CTLE) circuit. A zero-forcing least-mean-square (ZF LMS) procedure is applied to adapt the settings of the CTLE stages. The amplitude settings and the frequency boost settings of the CTLE stages are adapted within the ZF LMS procedure. In an exemplary implementation, an error screening threshold may be applied to an error signal within the ZF LMS procedure to generate a reduced error signal such that weight updates do not occur if the error signal is below the error screening threshold. In addition, if an accumulated sign error signal within the ZF LMS procedure reaches a predetermined maximum indicative of a high loss channel, then a setting for a variable gain amplifier may be increased, and an amplitude setting for the CTLE circuit may be decreased. Other embodiments, aspects and features are also disclosed.

14 Claims, 11 Drawing Sheets

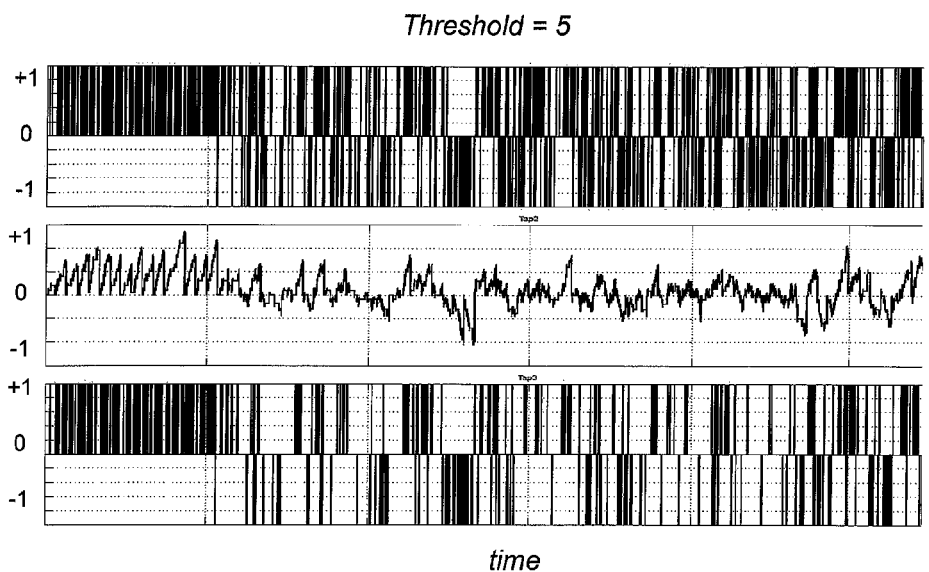
FIG. 6A
FIG. 6B
FIG. 6C
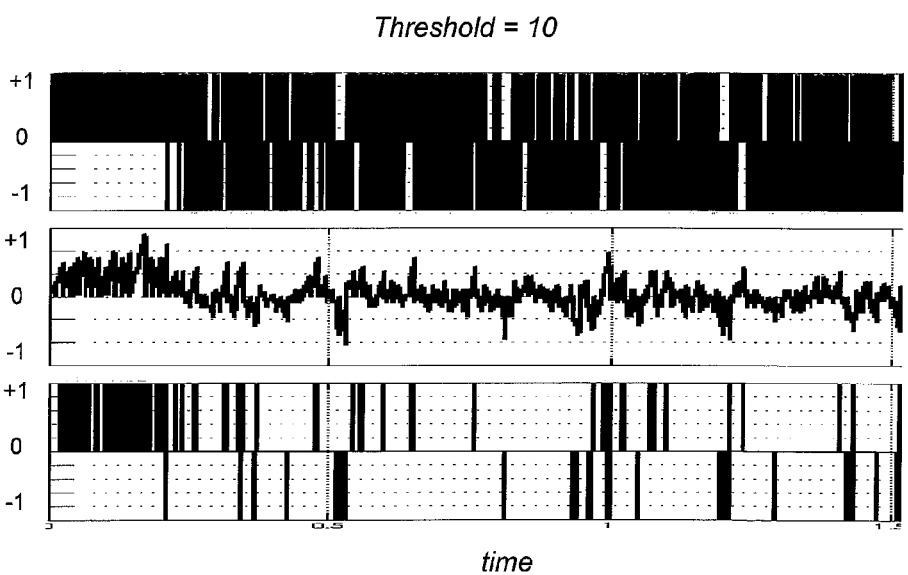
FIG. 6D
FIG. 6E
FIG. 6F

Choose Sequential

Total stages = 4
Total settings = $N_{CTLE\_DACL}$ (a)

| 1 | 2 | 3 | 4 |
|---|---|---|---|
| 5 | 6 | 7 | 8 |
| . | . | . | . |
| 29 | 30 | 31 | 32 |

Stage 1  Stage 2  Stage 3  Stage 4

(b)

| 1 | 3 | 5 | 7 |
|---|---|---|---|
| 2 | 4 | 6 | 8 |
| . | . | . | . |
| 29 | 30 | 31 | 32 |

Stage 1  Stage 2  Stage 3  Stage 4

(c)

| 1 | 9 | 17 | 25 |
|---|---|---|---|
| 2 | 10 | 18 | 26 |
| .. | .. | .. | .. |
| 8 | 16 | 24 | 32 |

Stage 1  Stage 2  Stage 3  Stage 4

CTLE DC DAC Sequential Tables

*FIG. 7*

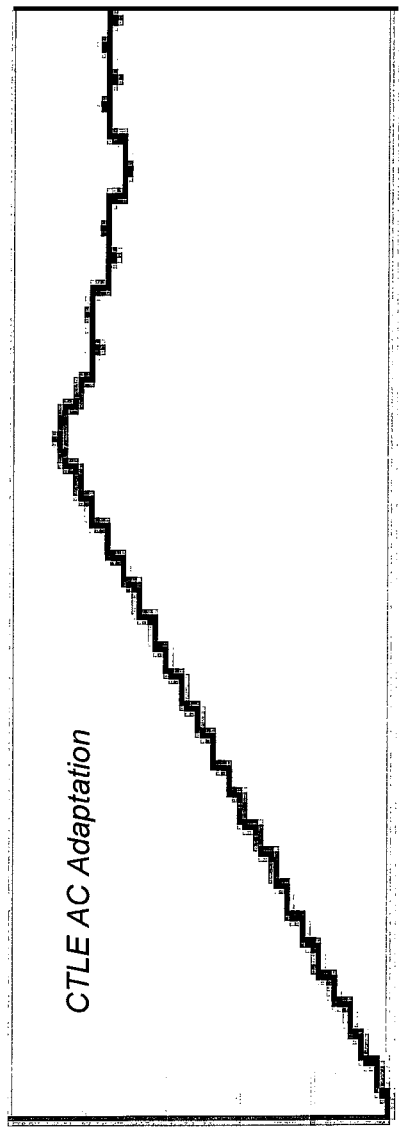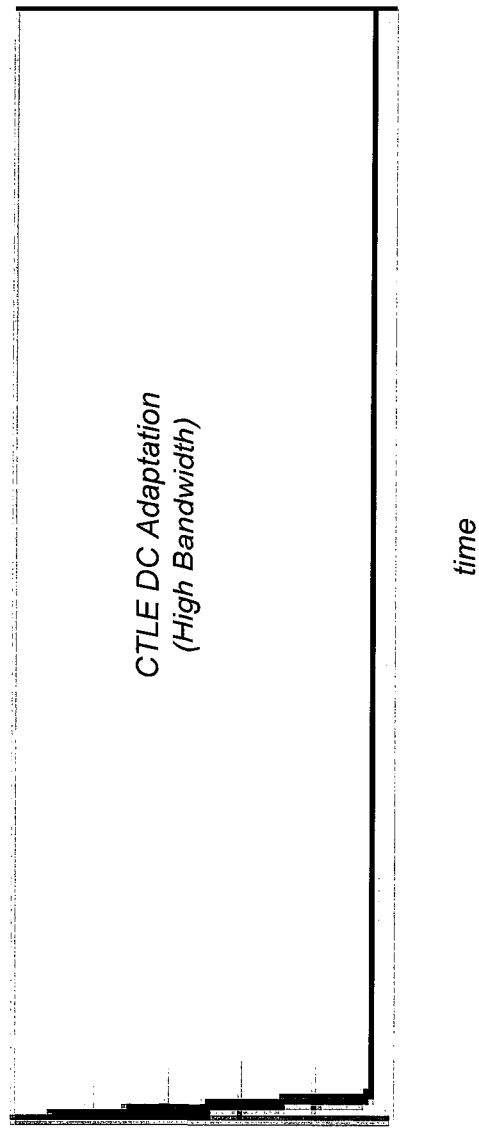

METHODS AND APPARATUS FOR MULTIPLE-STAGE CTLE ADAPTATION

BACKGROUND

1. Technical Field

The present invention relates generally to data communications. More particularly, the present invention relates to circuitry for high-speed data links.

2. Description of the Background Art

High-speed data links are used to communicate data between devices in a system. Serial interface protocols have been developed at increasingly fast data rates for such high-speed data links.

SUMMARY

One embodiment relates to a method of equalizing an input data signal using a multiple-stage continuous-time linear equalization (CTLE) circuit. A zero-forcing least-mean-square (ZF LMS) procedure is applied to adapt the settings of the CTLE stages. The amplitude settings and the frequency boost settings of the CTLE stages are adapted within the ZF LMS procedure. Another embodiment relates to a receiver circuit with a multiple-stage CTLE circuit that includes a CTLE adaptation circuit module which uses the ZF LMS procedure to adapt the settings of the CTLE stages.

In an exemplary implementation, an error screening threshold may be applied to an error signal within the ZF LMS procedure to generate a reduced error signal such that weight updates do not occur if the error signal is below the error screening threshold. In addition, if an accumulated sign error signal within the ZF LMS procedure reaches a predetermined maximum indicative of a high loss channel, then a setting for a variable gain amplifier may be increased, and an amplitude setting for the CTLE circuit may be decreased.

Other embodiments, aspects and features are also disclosed.

BRIEF DESCRIPTION OF THE DRAWINGS

FIGS. 6A through 6C depict results of error signal screening with a first threshold in accordance with an embodiment of the invention.

FIGS. 6D through 6F depict results of error signal screening using a second threshold in accordance with an embodiment of the invention.

FIG. 7 is a diagram showing exemplary DAC sequential tables for CTLE DC adaptation in accordance with an embodiment of the invention.

FIGS. 8A and 8B depict CTLE AC and DC adaptations, respectively, in accordance with an embodiment of the invention.

DETAILED DESCRIPTION

Figure 1:
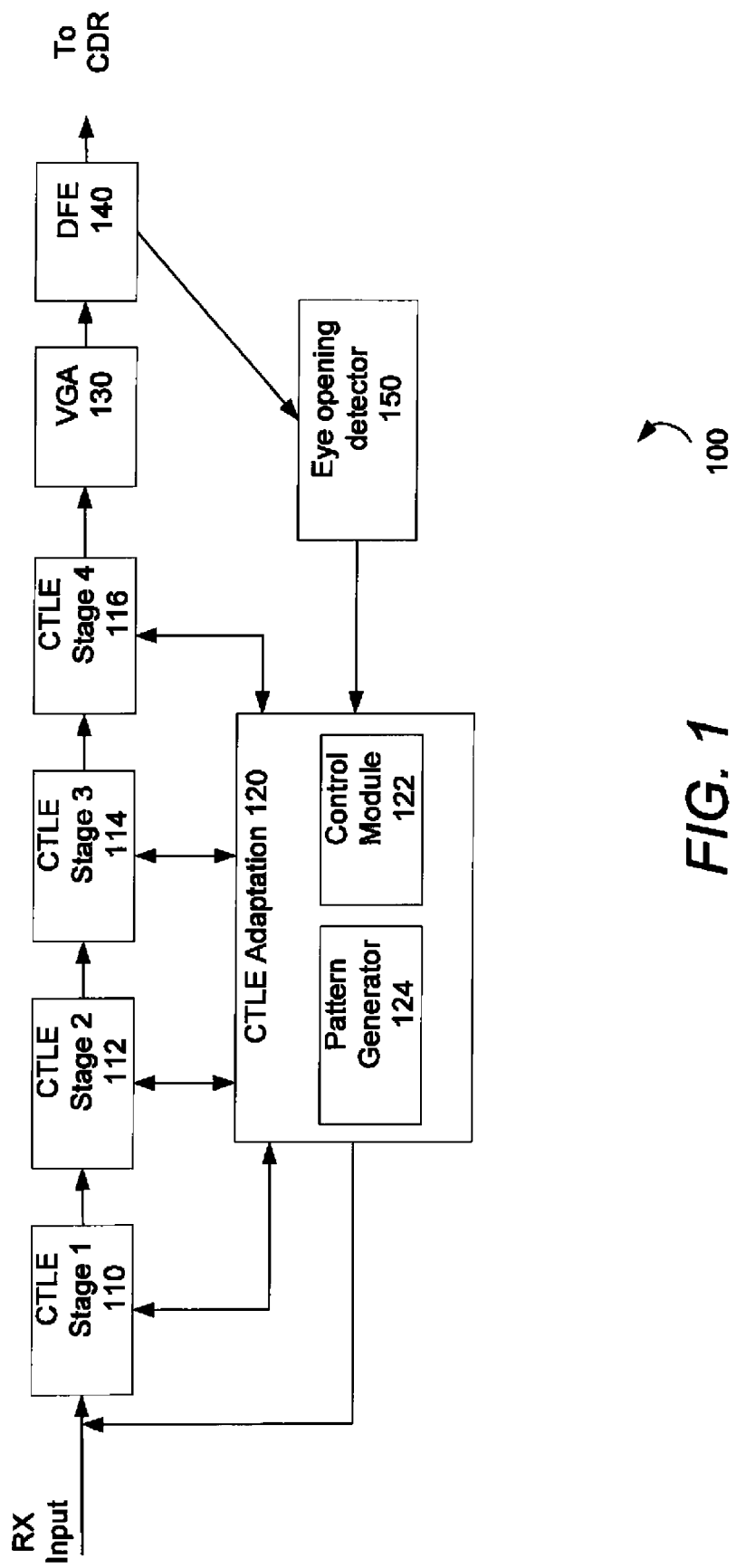
FIG. 1 depicts an exemplary implementation of a receiver having multiple-stage CTLE circuit in accordance with an embodiment of the invention.

Receiver (RX) equalization may make use of a continuous-time linear equalization (CTLE) circuit in combination with a decision feedback equalization (DFE) circuit so as to overcome high-frequency losses through a transmission channel. The frequency response of a link channel may be viewed as a kind of low-pass filter, and the high-pass response of the CTLE may be used to compensate for the channel loss.

High-speed transceivers in field programmable gate arrays and other integrated circuits may support various communication standards. In order to accommodate the amplitude variations and high-frequency loss for different channels under the various standards, adaptive CTLE may be used.

Modern transceivers may use multiple stages of CTLE to compensate for the high insertion loss. The settings of the multiple stages may be programmable. However, there may be many thousands of possible combinations of settings for a multiple-stage (for example, a four-stage) CTLE, and selecting a particular combination to use may be a difficult task.

A prior CTLE circuit uses an analog adaptation engine. The analog adaptation engine directly measures high and low frequency energies in order to equalize the high and low frequency components. However, the analog adaptation engine suffers a bandwidth limitation due to the analog filters, PVT (process, voltage and temperature) sensitivities, mismatching, and so on. Furthermore, the AC (alternating current) and DC (direct current) steps used to search for the analog settings are often too coarse to converge on the optimal equalization settings. This typically results in over equalization or under equalization and may cause high receiver jitter or an inadequate eye opening.

Another challenge in selecting the CTLE settings is that the DC setting may have a large impact on the AC boost. Hence, tuning CTLE settings for an optimized equalization is a complex problem that may be quite burdensome.

The present disclosure provides an innovative solution for multiple-stage CTLE adaptation. The solution uses a digital adaptation engine for a multiple-stage CTLE which is designed to systematically optimize signal integrity.

In an exemplary implementation of the solution, the primary convergence algorithm for CTLE AC adaptation uses a zero-forcing least-mean-square (ZF LFS) procedure based on a predetermined data pattern (in particular, 110/001). The procedure may utilize a novel error filtering technique for reducing receiver jitter. The error filtering technique filters out unwanted weight updates caused by the ZF LMS procedure.

Both real-time adaptation and one-time adaptation for a given channel are available for a user to select. In an exemplary implementation, there are six CTLE AC adaptation sequential arrays available for selection in order to maximum AC boosting for a given channel.

An exemplary implementation of the presently-disclosed invention starts to maximize the receiver's signal-to-noise ratio (SNR) by regulating the first stage of CTLE DC settings followed by optimizing AC boost. This is determined to be advantageous because the regulating the input amplitude of the CTLE is very beneficial for maximizing the SNR.

The exemplary implementation also uses the VGA to make up for DC loss while maximizing AC boosting for high loss channels. In other words, the VGA is allowed to increase its gain to maintain overall amplitude regulation for those high loss channels. This feature allows the CTLE DC settings to be further reduced until the VGA reaches its maximum value.

FIG. 1 depicts an exemplary implementation of a receiver 100 having multiple-stage CTLE circuit in accordance with an embodiment of the invention. As shown, the CTLE circuit may include four CTLE stages in series: CTLE Stage 1 110; CTLE Stage 2 112; CTLE Stage 3 114; and CTLE Stage 4 116.

A CTLE adaptation circuit module 120 is communicatively coupled to control each of the CTLE stages and may include a control module 122 and a pattern generator 124 to implement the digital adaptation procedures disclosed herein. The pattern generator 124 may be controlled to generate a data pattern and provide it to the input of the first CTLE stage.

The output of the final CTLE stage may be provided to a variable gain amplifier (VGA) 130 which may provide an amplified signal to a decision feedback equalization (DFE) circuit 140. The output of the DFE circuit 140 is the equalized RX signal and is provided to a clock data recovery (CDR) circuit and also may be provided to eye opening detection circuit 150. The CTLE adaptation circuit module 120 may receive error and other data from the eye opening detection circuit 150.

In an exemplary implementation, each CTLE stage may have eight DC settings and sixteen AC settings. Other numbers of settings per stage are also possible, and the numbers of settings need not necessarily be the same for the different stages.

Figure 2:
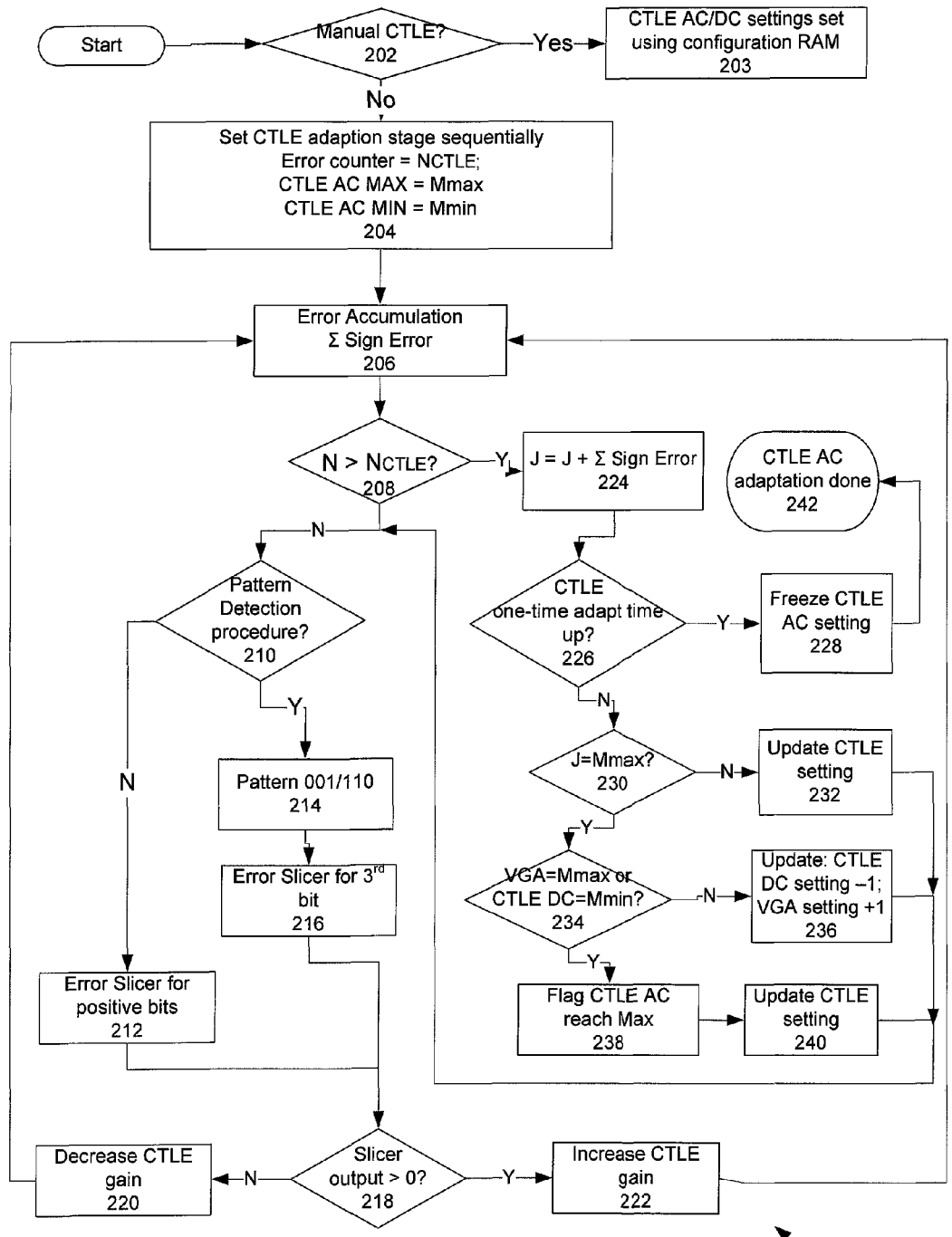
FIG. 2 is a flow chart of an exemplary implementation of a method for CTLE AC adaptation using a zero-forcing least-mean-square (ZF LMS) procedure in accordance with an embodiment of the invention.

FIG. 2 is a flow chart of an exemplary implementation of a method 200 for CTLE AC adaptation using a ZF LMS procedure in accordance with an embodiment of the invention. As discussed above, the problem being solved by this method 200 is a complex one because there are many thousands of possible frequency responses with different DC settings and different high-frequency peaking positions.

The method 200 starts with a maximum signal-to-noise ratio (SNR) by regulating the first stage of CTLE DC settings followed by optimizing AC boost. The method 200 includes a novel pattern-based zero-forcing least-mean-square (ZF LFS) procedure. In addition, a novel error filter technique is disclosed that modifies the ZF LFS procedure to reduce RX jitter. Both real-time adaptation and one-time adaptation for a given channel are available for a user to select.

Per step 202, an initial determination may be made as to whether the CTLE settings are to be set manually. This determination may be done by checking a configuration bit, for example. If so, then CTLE AC and DC settings for the multiple stages may be set per step 203 based on values in configuration RAM. Otherwise, the procedure 200 may move forward to step 204 and used the modified ZF LMS procedure to set the CTLE settings.

Per step 204, the adaptation may be performed sequentially for each of the multiple CTLE stages. An error counter $N_{cTLE}$ may be initialized, and minimum and maximum values for the AC boost may be set to initial values: CTLE AC MAX=Mmax; and CTLE AC MIN=Mmin.

Per step 206, error accumulation may be performed. The error accumulation may involve a summation of the signs of detected errors ($\Sigma$ Sign Error).

Per step 208, after a predetermined period of accumulation, a determination may be made as to whether the CTLE update counter N is greater than the error counter $N_{CTLE}$. If the CTLE update counter N not greater than the error counter $N_{CTLE}$ in step 208, then a determination may be made, per step 210, as to whether a pattern detection procedure is to be applied (for frequency or AC boost adaptation) or not (for amplitude or DC adaptation). This determination may be made by checking control bits for selection of either pattern detection or amplitude detection.

If a pattern detection procedure is not to be applied per step 210, then an amplitude-based procedure for amplitude adaptation may be applied. In this case, the error slicer may be applied for positive bits per step 212.

Otherwise, if a pattern detection procedure is to be applied for frequency boost adaptation per step 210, then predetermined data patterns may be generated and provided to the CTLE per step 214. In an exemplary implementation, the predetermined data patterns may be the bit pattern 001 and its complementary pattern 110. Per step 216, an error slicer may then be applied to the last bit of the data pattern. Where the pattern is 001/110, the error slicer is applied to the third bit.

Thereafter, a determination may be made, per step 218, as to whether the error slicer output is positive. If the error slicer output is not positive, then the CTLE gain may be decreased per step 220. Otherwise, if the error slicer output is positive, then the CTLE gain may be increased per step 222. Thereafter, the method 200 loops back to step 206 where further error accumulation is performed.

Now referring back to step 208, if the CTLE update counter N is larger than the error counter $N_{CTLE}$, then a CTLE AC setting counter J may be incremented by the accumulated error ($\Sigma$Sign Error) per step 224.

Thereafter, per step 226, a determination may be made as to whether a CTLE one-time adaptation time up has occurred. The determination of whether or not the time up has occurred may be performed in accordance with the method 400 of FIG. 4, which is described in further detail below. If the one-time adaptation time up has occurred per step 226, then the CTLE AC setting for that stage may be frozen per step 228, and the CTLE AC adaptation for that stage may be deemed to be done per step 242.

Otherwise, if the one-time adaptation time up has not occurred per step 226, then a further determination may be made, per step 230, as to whether the CTLE step counter J is at Mmax. If J is not at Mmax, then the CTLE setting may be updated per step 232, and the method 200 goes to step 210 and the subsequent steps described above.

Otherwise, if J is at Mmax per step 230, then a further determination may be made, per step 234, as to whether the VGA setting is at Mmax, or the CTLE DC setting is at Mmin. (Note that, in this exemplary procedure, the value for Mmax is the same in blocks 230 and 234.) If neither is true (i.e. VGA setting is not at Mmax and CTLE DC setting is not at Mmin), then the CTLE DC setting may be decremented, and the VGA setting may be incremented, per step 236. Thereafter, the method 200 goes to step 210 and the subsequent steps described above.

Finally, if either the VGA setting is at Mmax, or the CTLE DC setting is at Mmin, per step 234, then a flag may be set indicating that the CTLE AC boost has reached a maximal value per step 238, and the CTLE setting may be updated per step 240. Thereafter, the method 200 goes to step 210 and the subsequent steps described above.

Figure 3:
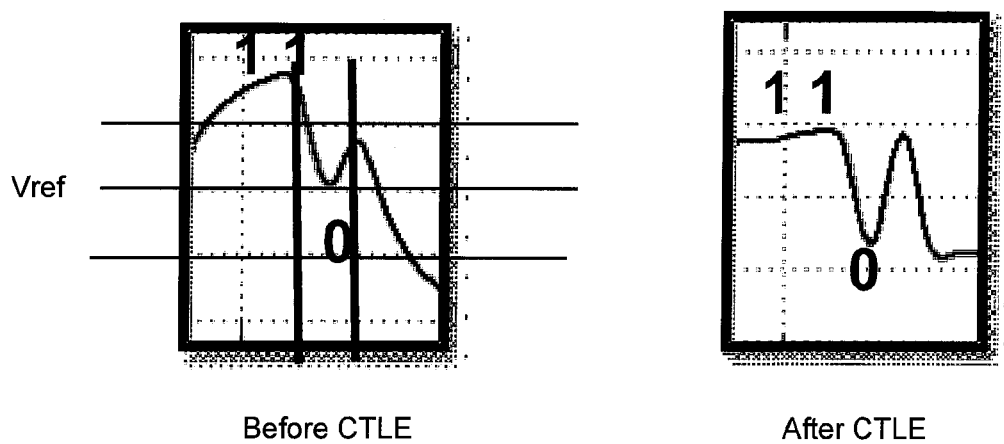
FIG. 3 is a diagram depicting a 110 pattern signal before and after CTLE in accordance with an embodiment of the invention.

FIG. 3 is a diagram depicting a 110 pattern signal before and after CTLE in accordance with an embodiment of the invention. The 110 pattern signal on the left is an example showing distortion in the signal levels before CTLE. After CTLE, the distortion may be largely removed, as shown on the right.

Figure 4:
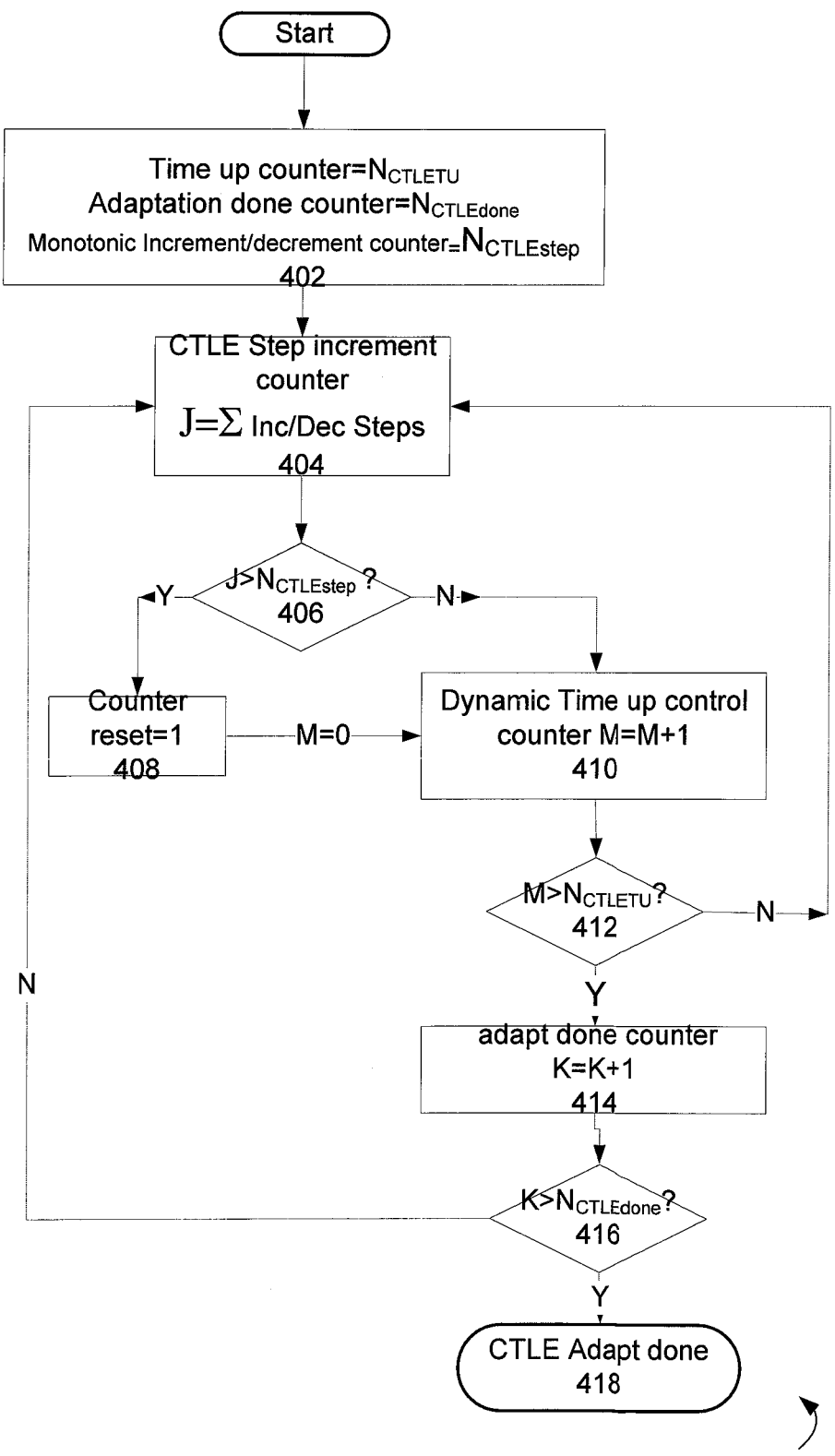
FIG. 4 is a flow chart of an exemplary implementation of a CTLE AC Time Up procedure which determines a CTLE Adaptation Done status in accordance with an embodiment of the invention.

FIG. 4 is a flow chart of an exemplary implementation of a CTLE AC Time Up procedure 400 which determines a CTLE Adapt done status in accordance with an embodiment of the invention. As shown, the procedure 400 may begin by initializing variables to predetermined values per step 402. In particular, the initialized variables may include: a time up counter $N_{CTLETU}$, an adaptation done counter $N_{CTLEdone}$, and a monotonic increment/decrement counter $N_{CTLEstep}$.

In step 404, a CTLE step increment counter J may be used to accumulate a summation of the increment and decrement steps (J=ΣInc/Dec Steps). Per step 406, a determination may be made as to whether the CTLE step increment counter J is greater than the monotonic increment/decrement counter $N_{CTLEstep}$.

If J is greater than $N_{CTLEstep}$ per step 406, then a counter reset flag may be set to one (Counter reset=1). Thereafter, the dynamic time up control counter M may be reset to zero (M=0) and then incremented (M=M+1) per step 410. If J is not greater than $N_{CTLEstep}$ per step 406, then the dynamic time up control counter M may be incremented (M=M+1) per step 410.

Per step 412, a determination may be made as to whether the dynamic time up control counter M is greater than the time up counter $N_{CTLETU}$. If M is not greater than $N_{CTLETU}$, then the procedure 400 loops back to step 404. On the other hand, if M is greater than $N_{CTLETU}$, then the procedure 400 goes forward to step 414.

In step 414, an adapt done counter K is incremented (K=K+1). Thereafter, a determination may be made, per step 416, as to whether K is greater than $N_{CTLEdone}$. If K is not greater than $N_{CTLEdone}$, then the procedure loops 400 back to step 404. Otherwise, if K is greater than NCTLEdone, then the procedure 400 sets a flag that indicates the CTLE adapt done status per step 418.

FIGS. 5A-5F depict exemplary CTLE AC DAC sequential charts in accordance with embodiments of the invention. In the exemplary implementation, the CTE has four stages, and six exemplary DAC sequential charts are shown.

Figure 5A:
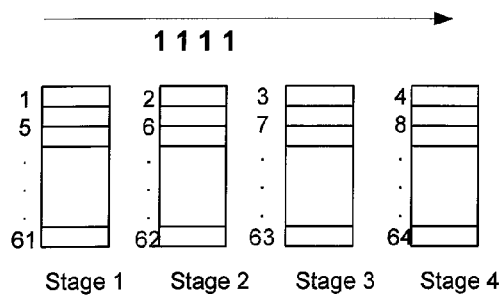
FIGS. 5A through 5F depict exemplary CTLE AC DAC sequential charts in accordance with embodiments of the invention.

A first sequential chart is shown in FIG. 5A. In this sequence, the first stage may be set to a first (lowest) setting, then the second stage may be set to the first (lowest) setting, then the third stage may be set to the first (lowest) setting, then the fourth stage may be set to the first (lowest) setting. These first four steps in the sequence are denoted 1, 2, 3 and 4 in the first row. For the fifth through eighth elements in the sequence, the first stage may be set to a second setting, then the second stage may be set to the second setting, then the third stage may be set to the second setting, then the fourth stage may be set to the second setting. These next four steps in the sequence are denoted 5, 6, 7, and 8 in the second row. And so on, until the $61^{st}$ through $64^{th}$ steps in the sequence, in which the first through fourth stages, respectively, may be set to the sixteenth setting.

Figure 5B:
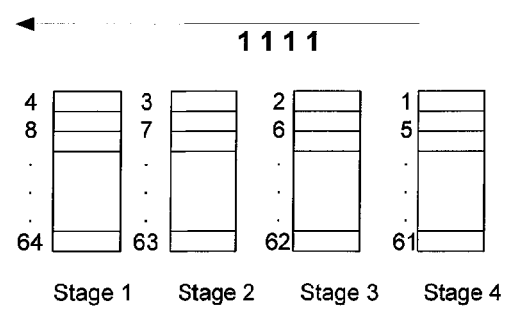

A second sequential chart is provided in FIG. 5B. In this sequence, the fourth stage may be set to a first (lowest) setting, then the third stage may be set to the first (lowest) setting, then the second stage may be set to the first (lowest) setting, then the first stage may be set to the first (lowest) setting. These first four steps in the sequence are denoted 1, 2, 3 and 4 from right to left in the first row. For the fifth through eighth steps in the sequence, the fourth stage may be set to a second setting, then the third stage may be set to the second setting, then the second stage may be set to the second setting, then the first stage may be set to the second setting. These next four steps in the sequence are denoted 5, 6, 7, and 8 from right to left in the second row. And so on, until the $61^{st}$ through $64^{th}$ steps in the sequence, in which the fourth through first stages, respectively, may be set to the sixteenth setting.

Figure 5C:
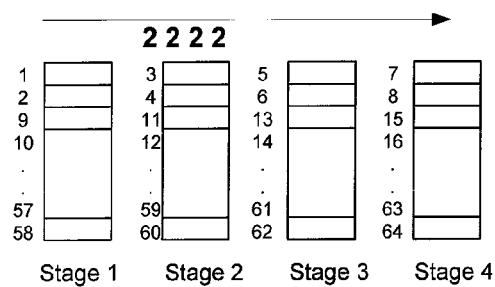

A third sequential chart is shown in FIG. 5C. In this sequence, the first stage may be set to a first (lowest) setting, then the first stage may be set to a second setting, then the second stage may be set to the first (lowest) setting, then the second stage may be set to a second setting, then the third stage may be set to the first (lowest) setting, then the third stage may be set to a second setting, then the fourth stage may be set to the first (lowest) setting, then the fourth stage may be set to the second setting. These first eight steps in the sequence are denoted 1, 2, 3, 4, 5, 6, 7 and 8 in the first two rows. Similarly for the next group of eight steps in the sequence, and so on.

Figure 5D:
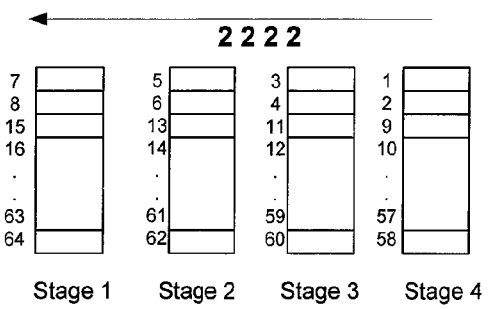

A fourth sequential chart is shown in FIG. 5D. In this sequence, the fourth stage may be set to a first (lowest) setting, then the fourth stage may be set to a second setting, then the third stage may be set to the first (lowest) setting, then the third stage may be set to a second setting, then the second stage may be set to the first (lowest) setting, then the second stage may be set to a second setting, then the first stage may be set to the first (lowest) setting, then the first stage may be set to the second setting. These first eight steps in the sequence are denoted 1, 2, 3, 4, 5, 6, 7 and 8 in the first two rows. Similarly for the next group of eight steps in the sequence, and so on.

Figure 5E:
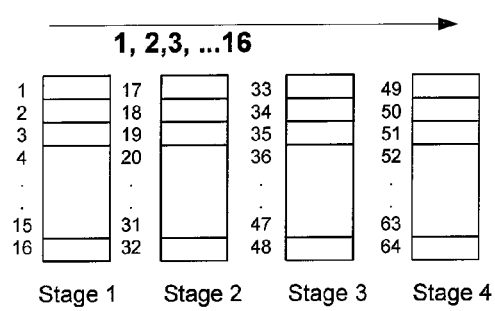

A fifth sequential chart is shown in FIG. 5E. In this sequence, the first stage may be set to a first (lowest) setting, then a second setting, then a third setting, and so on, until a sixteenth (highest) setting. These first sixteen steps in the sequence are denoted 1, 2, . . . , 16 in the first column. The next sixteen steps in the sequence pertain to the second stage and are denoted 17, 18, . . . , 32 in the second column. Similarly, the next group of sixteen steps pertain to the third stage and are denoted 33 through 48 in the third column. Finally, the last group of sixteen steps pertain to the fourth stage and are denoted 49 through 64 in the fourth column.

Figure 5F:
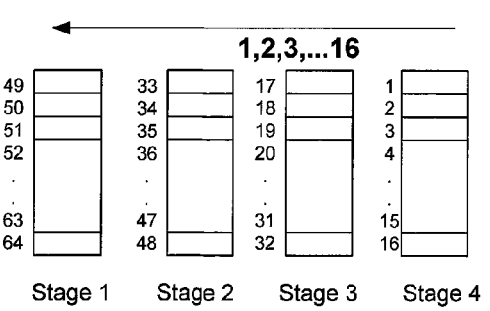

A sixth sequential chart is shown in FIG. 5F. In this sequence, the fourth stage may be set to a first (lowest) setting, then a second setting, then a third setting, and so on, until a sixteenth (highest) setting. These first sixteen steps in the sequence are denoted 1, 2, . . . , 16 in the fourth column. The next sixteen steps in the sequence pertain to the third stage and are denoted 17, 18, . . . , 32 in the third column. Similarly, the next group of sixteen steps pertain to the second stage and are denoted 33 through 48 in the second column. Finally, the last group of sixteen steps pertain to the first stage and are denoted 49 through 64 in the first column.

In an exemplary implementation, a threshold for error signal screening may be programmable. The screening threshold functions to reduce unnecessary weight bouncing so as to reduce quantization noise.

FIGS. 6A-6C depict results of error signal screening (filtering) with a first threshold in accordance with an embodiment of the invention. In this example, the screening threshold is set to five. FIG. 6A shows the error signal before screening. FIG. 6B shows the corresponding up-down error signal. Filtering is applied to this up-down error signal such that if the up-down error signal is less than the screening threshold, then no weight update is made. FIG. 6C shows the error signal after the screening (filtering).

FIGS. 6D-6F depict results of error signal screening (filtering) using a second threshold in accordance with an embodiment of the invention. In this example, the screening threshold is set to ten. FIG. 6D shows the error signal before screening. FIG. 6E shows the corresponding up-down error signal. Filtering is applied to this up-down error signal such that if the up-down error signal is less than the screening threshold, then no weight update is made. FIG. 6F shows the error signal after the screening (filtering). As seen, the higher threshold results in less frequent updates.

FIG. 7 is a diagram showing exemplary DAC sequential tables for CTLE DC adaptation in accordance with an embodiment of the invention. In this example, the CTLE has four stages, and three exemplary DAC sequential tables are shown.

The first sequential table (a) provides a first sequence which may be used as a default sequence. In this sequence, the first (weakest) stage may be set to a first (lowest) setting, then the second stage may be set to the first (lowest) setting, then the third stage may be set to the first (lowest) setting, then the fourth (strongest) stage may be set to the first (lowest) setting. These first four steps in the sequence are denoted 1, 2, 3 and 4 in the first row. For the fifth through eighth steps in the sequence, the first stage may be set to a second setting, then the second stage may be set to the second setting, then the third stage may be set to the second setting, then the fourth stage may be set to the second setting. These next four steps in the sequence are denoted 5, 6, 7, and 8 in the second row. And so on, until the $29^{th}$ through $32^{nd}$ steps in the sequence, in which the first through fourth stages, respectively, may be set to the eighth setting.

The second sequential table (b) provides a second sequence which may be used for small signals. In this sequence, the first stage may be set to a first (lowest) setting, then the first stage may be set to a second setting, then the second stage may be set to the first (lowest) setting, then the second stage may be set to a second setting, then the third stage may be set to the first (lowest) setting, then the third stage may be set to a second setting, then the fourth stage may be set to the first (lowest) setting, then the fourth stage may be set to the second setting. These first eight steps in the sequence are denoted 1, 2, 3, 4, 5, 6, 7 and 8 in the first two rows. Similarly for the next group of eight steps in the sequence, and so on.

The third sequential table (c) provides a third sequence which may be used for very small signals. In this sequence, the first stage may be set to a first (lowest) setting, then a second setting, then a third setting, and so on, until an eight (highest) setting. These first eight steps in the sequence are denoted 1, 2, . . . , 8 in the first column. The next eight steps in the sequence pertain to the second stage and are denoted 9, 10, . . . , 16 in the second column. Similarly, the next group of eight steps pertain to the third stage and are denoted 17 through 24 in the fourth column. Finally, the last group of eight steps pertain to the fourth stage and are denoted 25 through 32 in the fourth column.

FIGS. 8A and 8B depict CTLE AC and DC adaptations, respectively, in accordance with an embodiment of the invention. An example of the adaptation of CTLE AC boosting over time is shown in FIG. 8A, and an example of the adaptation of a CTLE DC level, at high bandwidth, is shown in FIG. 8B.

Figure 9A:
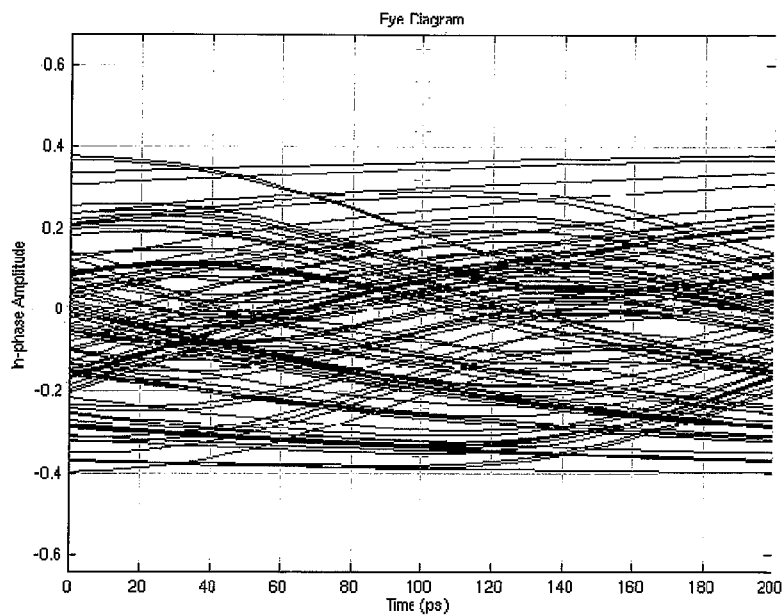
FIGS. 9A and 9B depict the input data before and after CTLE in accordance with an embodiment of the invention.
Figure 9B:
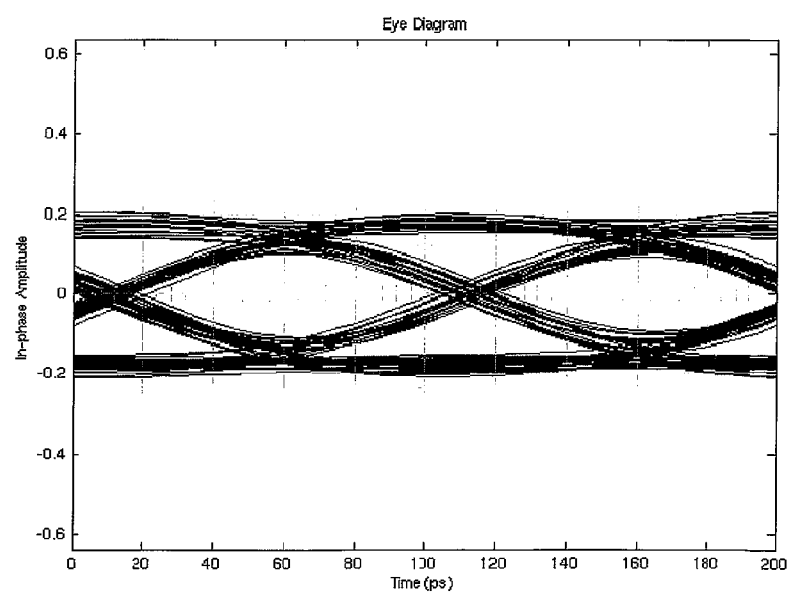

FIG. 9A is an eye diagram for the input data before CTLE is applied. In comparison, FIG. 9B is an eye diagram obtained after CTLE is adapted and applied in accordance with an embodiment of the invention. As shown, the application of the CTLE after adaptation provides a substantially high and wide eye opening.

Figure 10:
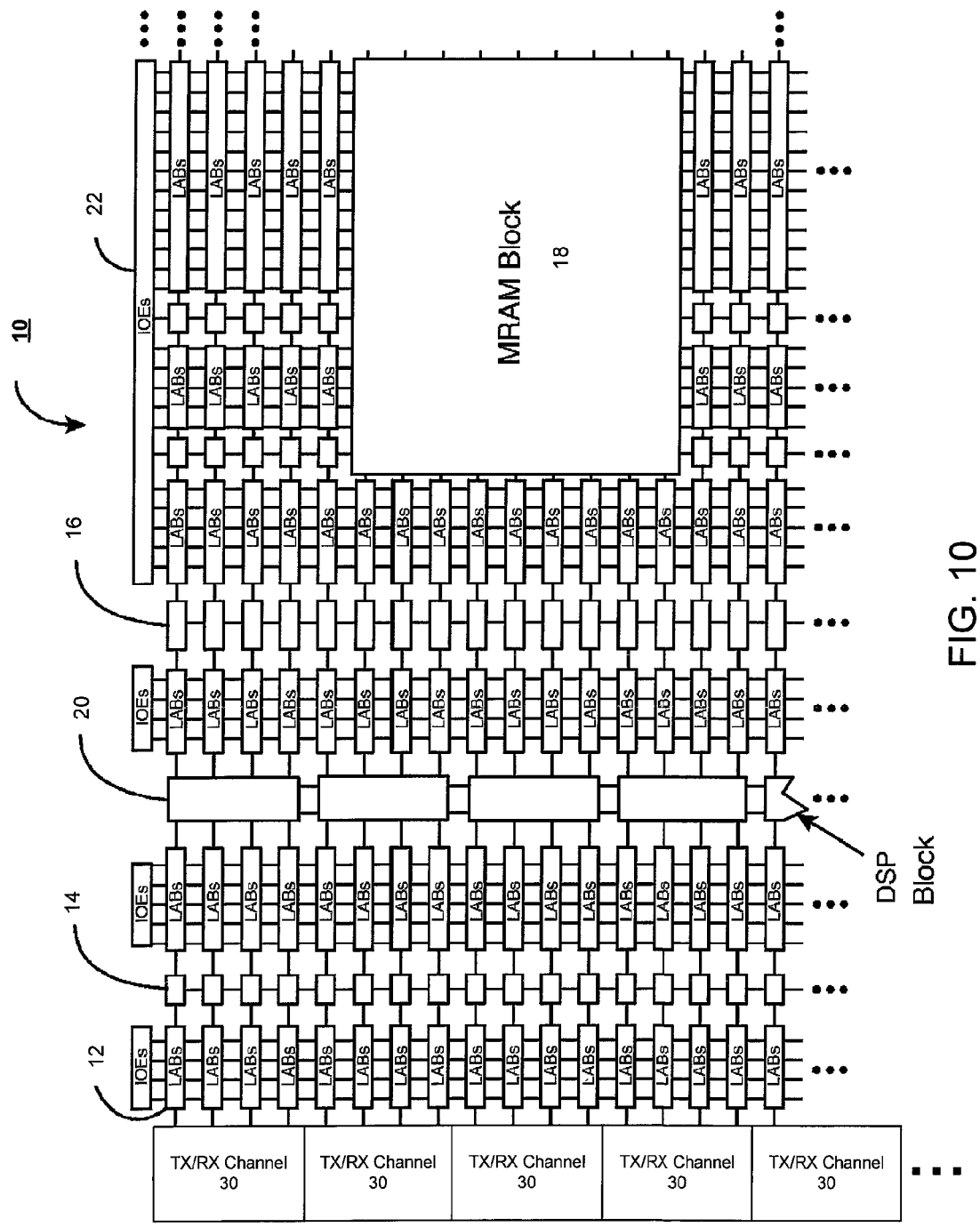
FIG. 10 is a simplified partial block diagram of a field programmable gate array (FPGA) that can include aspects of the present invention.

FIG. 10 is a simplified partial block diagram of a field programmable gate array (FPGA) 10 that can include aspects of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs. A TX/RX channel circuit 30 may include, among other circuitry, the receiver circuitry described herein.

It is to be understood that FPGA 10 is described herein for illustrative purposes only and that the present invention can be implemented in many different types of PLDs, FPGAs, and ASICs.

Figure 11:
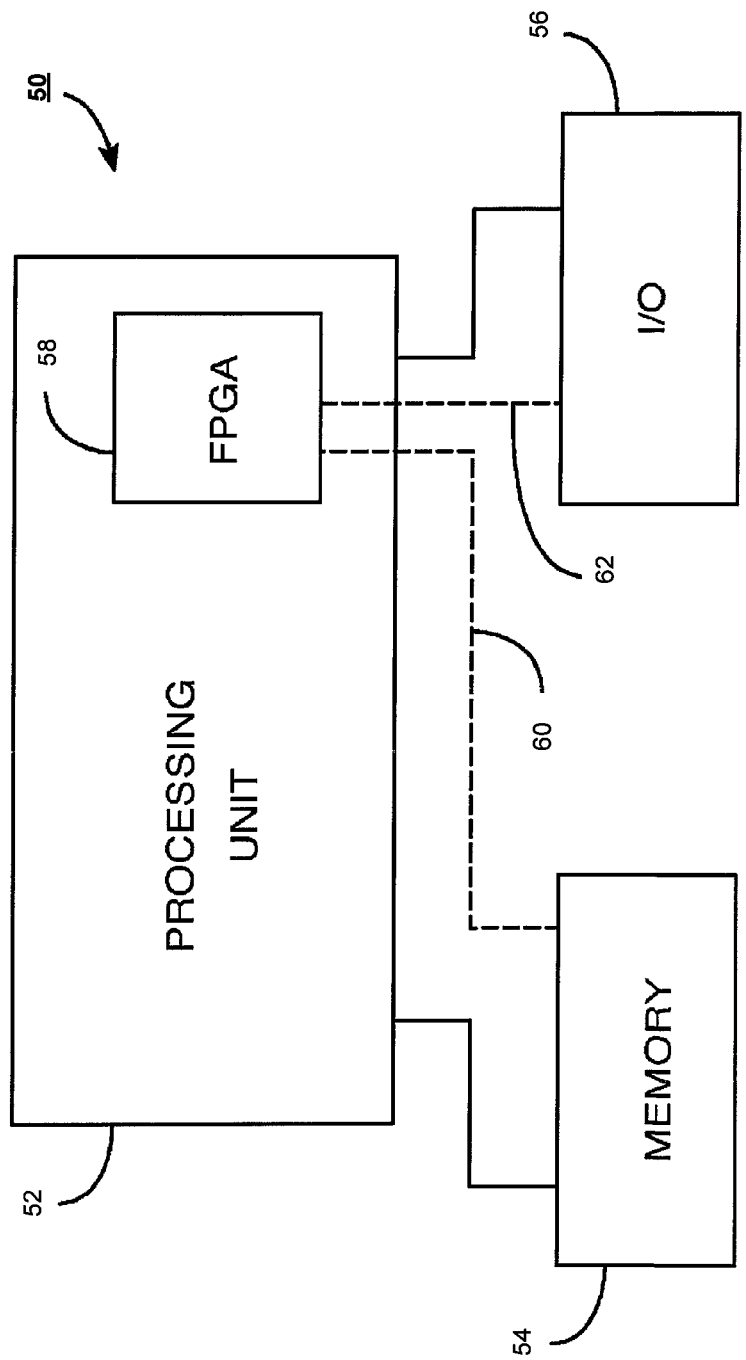
FIG. 11 shows a block diagram of an exemplary digital system 50 that includes an FPGA as one of several components and that may employ techniques of the present invention.

FIG. 11 shows a block diagram of an exemplary digital system 50 that includes an FPGA as one of several components and that may employ techniques of the present invention. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of equalizing an input data signal using a continuous-time linear equalization (CTLE) circuit, the method comprising:
   receiving the input data signal using the CTLE circuit comprising a plurality of CTLE stages;
   applying a zero-forcing least-mean-square (ZF LMS) procedure to adapt the settings of the plurality of CTLE stages;
   adapting amplitude settings of the plurality of CTLE stages within the ZF LMS procedure;
   adapting frequency boost settings of the plurality of CTLE stages within the ZF LMS procedure; and
   if an accumulated sign error signal within the ZF LMS procedure reaches a predetermined maximum indicative of a high loss channel, then increasing a setting for a variable gain amplifier and decreasing an amplitude setting for the CTLE circuit.

2. A method of equalizing an input data signal using a continuous-time linear equalization (CTLE) circuit, the method comprising:
   receiving the input data signal using the CTLE circuit comprising a plurality of CTLE stages;
   applying a zero-forcing least-mean-square (ZF LMS) procedure to adapt the settings of the plurality of CTLE stages;
   adapting amplitude settings of the plurality of CTLE stages within the ZF LMS procedure; and
   adapting frequency boost settings of the plurality of CTLE stages within the ZF LMS procedure, wherein adapting the frequency boost settings comprises:
      generating a three-bit pattern having a first two bits of one value followed by a third bit of a different value than the first two bits;
      applying an error slicer to the third bit to generate an output; and
      changing a frequency boost setting depending on the output of the error slicer.

3. A method of equalizing an input data signal using a continuous-time linear equalization (CTLE) circuit, the method comprising:
   receiving the input data signal using the CTLE circuit comprising a plurality of CTLE stages;
   applying a zero-forcing least-mean-square (ZF LMS) procedure to adapt the settings of the plurality of CTLE stages;
   adapting amplitude settings of the plurality of CTLE stages within the ZF LMS procedure; and
   adapting frequency boost settings of the plurality of CTLE stages within the ZF LMS procedure, wherein adapting the frequency boost settings uses a predetermined sequential order, and wherein the predetermined sequential order increases a frequency boost setting in a stage once prior to increasing the frequency boost setting in a next stage.

4. The method of claim 3, wherein the predetermined sequential order increases the frequency boost setting in the stage a second time prior to increasing the frequency boost setting in the next stage.

5. The method of claim 3, wherein the predetermined sequential order increases the frequency boost setting in the stage up to a maximum prior to increasing the frequency boost setting in the next stage.

6. A method of equalizing an input data signal using a continuous-time linear equalization (CTLE) circuit, the method comprising:
   receiving the input data signal using the CTLE circuit comprising a plurality of CTLE stages;
   applying a zero-forcing least-mean-square (ZF LMS) procedure to adapt the settings of the plurality of CTLE stages;
   adapting amplitude settings of the plurality of CTLE stages within the ZF LMS procedure; and
   adapting frequency boost settings of the plurality of CTLE stages within the ZF LMS procedure,
   wherein adapting the amplitude settings uses a predetermined sequential order, and wherein the predetermined sequential order increases an amplitude setting of a stage once prior to increasing the amplitude setting of a next stage.

7. The method of claim 6, wherein the predetermined sequential order increases the amplitude setting of the stage a second time prior to increasing the amplitude setting of the next stage.

8. The method of claim 6, wherein the predetermined sequential order increases the amplitude setting of the stage up to a maximum prior to increasing the amplitude setting of the next stage.

9. A receiver circuit for a data link, the receiver circuit comprising:
   a plurality of continuous-time linear equalizer (CTLE) stages for receiving an input data signal and outputting a linearly-equalized signal; and
   a CTLE adaptation module coupled to the plurality of CTLE stages, wherein the CTLE adaptation module applies a zero-forcing least-mean-square (ZF LMS) procedure to adapt the settings of the plurality of CTLE stages, wherein amplitude settings and frequency boost settings of the plurality of CTLE stages are adapted using the ZF LMS procedure, wherein the CTLE adaptation module applies an error screening threshold to an error signal with the ZF LMS procedure to generate a reduced error signal such that weight updates do not occur if the error signal is below the error screening threshold.

10. A receiver circuit for a data link, the receiver circuit comprising:
- a plurality of continuous-time linear equalizer (CTLE) stages for receiving an input data signal and outputting a linearly-equalized signal; and
- a CTLE adaptation module coupled to the plurality of CTLE stages, wherein the CTLE adaptation module applies a zero-forcinq least-mean-square (ZF LMS) procedure to adapt the settings of the plurality of CTLE stages, wherein amplitude settings and frequency boost settings of the plurality of CTLE stages are adapted using the ZF LMS procedure,
- wherein if an accumulated sign error signal within the ZF LMS procedure reaches a predetermined maximum indicative of a high loss channel, then increasing a setting for a variable gain amplifier and decreasing the amplitude setting for the CTLE stage.

11. A receiver circuit for a data link, the receiver circuit comprising:
- a plurality of continuous-time linear equalizer (CTLE) stages for receiving an input data signal and outputting a linearly-equalized signal; and
- a CTLE adaptation module coupled to the plurality of CTLE stages, wherein the CTLE adaptation module applies a zero-forcing least-mean-square (ZF LMS) procedure to adapt the settings of the plurality of CTLE stages, wherein amplitude settings and frequency boost settings of the plurality of CTLE stages are adapted using the ZF LMS procedure,
- wherein the CTLE adaptation module adapts the frequency boost settings by:
- generating a three-bit pattern having a first two bits of one value followed by a third bit of a different value than the first two bits;
- applying an error slicer to the third bit to generate an output; and
- changing a frequency boost setting depending on the output of the error slicer.

12. A method of equalizing an input data signal using a continuous-time linear equalization (CTLE) circuit, the method comprising:
- receiving the input data signal using the CTLE circuit comprising a plurality of CTLE stages;
- applying a zero-forcing least-mean-square (ZF LMS) procedure to adapt settings of the plurality of CTLE stages; and
- applying an error screening threshold to an error signal within the ZF LMS procedure to generate a reduced error signal such that weight updates do not occur if the error signal is below the error screening threshold.

13. The method of claim 12 further comprising:
- if an accumulated sign error signal within the ZF LMS procedure reaches a predetermined maximum indicative of a high loss channel, then increasing a setting for a variable gain amplifier and decreasing an amplitude of the CTLE circuit.

14. The method of claim 12 further comprising:
- adapting amplitude settings of the plurality of CTLE stages within the ZF LMS procedure; and
- adapting frequency boost settings of the plurality of CTLE stages within the ZF LMS procedure.

* * * * *